BEST AVAILABLE COPY

C. A. BISHOP.
CALCULATING MACHINE.
APPLICATION FILED FEB. 8, 1912.

1,081,089.

Patented Dec. 9, 1913.
4 SHEETS—SHEET 1.

WITNESSES

INVENTOR
Clarence A. Bishop
BY
ATTORNEYS.

C. A. BISHOP.
CALCULATING MACHINE.
APPLICATION FILED FEB. 8, 1912.

1,081,089.

Patented Dec. 9, 1913.
4 SHEETS—SHEET 4.

UNITED STATES PATENT OFFICE.

CLARENCE A. BISHOP, OF NEW YORK, N. Y.

CALCULATING-MACHINE.

1,081,089. Specification of Letters Patent. Patented Dec. 9, 1913.

Application filed February 8, 1912. Serial No. 676,229.

*To all whom it may concern:*

Be it known that I, CLARENCE A. BISHOP, a citizen of the United States, residing in the city of New York, borough of Brooklyn, county of Kings, and State of New York, have invented a certain new and useful Calculating-Machine, of which the following is a specification.

This invention is a calculating machine, particularly adapted for calculating wages, although it will be apparent from the hereinafter detailed description that the principle of the machine may be adopted for other purposes.
One of the principal objects of the invention is to calculate wages at a given rate for any period of time, such as a day or any fraction thereof, expeditiously, automatically and accurately.
With this object in view, the invention embodies a suitable type surface and a coöperating platen, the operative position of which platen relative to the printing surface is determined by a suitable designating expedient on a time card.

In the practical embodiment of the invention herein illustrated and described, the type surface is in the form of a rotatable printing cylinder provided with a plurality of series of printing characters, each series representing the wages at a given rate for various periods of time. In the said embodiment, the platen is shown as a pivoted hammer mounted on a carriage, whereby it may be moved into different operative positions, determined by the time card as specified.

It is preferred to have the designating mark on the time card in the form of a recess or perforation which, when the card is positioned in the machine, coöperates with a member on the carriage to determine the position of the printing hammer with respect to the wage scale by printing the particular wage value on the card. It is preferred to have the said member coöperate with the printing hammer in such manner that when it reaches its registering position with reference to the recess or perforation on the card, the printing hammer is released from its normal position so as to automatically effect the printing operation.

Other features of the invention, in addition to those to which reference has been made, will be apparent from the hereinafter detailed description.

In the accompanying drawings, I have illustrated one practical embodiment of the invention, but the construction shown therein is to be understood as illustrative, only, and not as defining the limits of the invention.

Fig. 3 is a vertical cross section on the line 3—3 of Fig. 2 looking in the direction of the arrow. Figs. 7 and 8 are views of time cards adapted to be used in connection with the machine.

In the practical embodiment of the invention shown in the drawings, a supporting frame A is provided with a table B, a chamber $a$ and posts $a'$ for supporting a guideway $c$ for a movable carriage C.

Table B may be of any suitable or preferred construction, and it is positioned upon the frame in a manner to close the top of chamber $a$, said table B being secured in any suitable way to the frame. The table is provided with a longitudinal slot $b$, the width of which is sufficient to expose a number of type bars, having wage scales, on a rotatable carrier as will presently appear, but in order to expose only one of the wage scales, the table is provided with a plate B' having a slot $b^2$, the width of which is sufficient to expose one of the wage scales.

Figure 1:
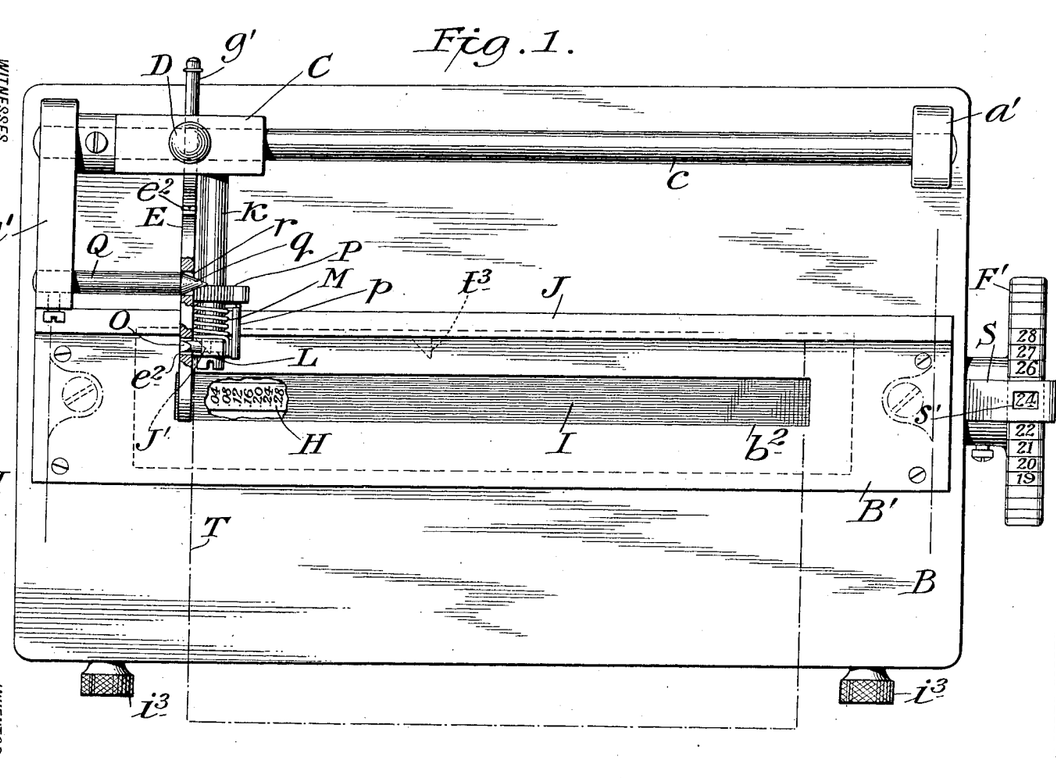
Figure 1 is a plan view of the new calculating machine, the dotted lines illustrating the position of a time card when said card is first placed in the machine and prior to the calculating operation.

The posts $a'$ extend upwardly from table B, said posts being positioned near one side edge of the table and at the respective ends thereof, the post near the left hand side of the table in Fig. 1 being somewhat wider than the post at the opposite end of the table. The guideway for movable carriage C is shown as consisting of parallel rods which are fixedly supported by posts $a'$, one of said rods being positioned below the other, and the two rods forming a guideway at one side of the slots in table B and plate B', respectively, said guideway being parallel to the slots. While I have shown and described the guideway as consisting of parallel rods $c$, $c$, it is evident that other forms of guideways for the carriage may be employed.

Carriage C is shown as a plate provided with apertures which receive rods $c$, $c$ forming the guideway, whereby the carriage is mounted or supported on the guideway for sliding movement freely thereon, said guideway operating to limit the carriage to movement in a rectilinear path and in a direction parallel to the slots in the table and top plate thereon. Said carriage is provided with a transverse slot $d$ within which is pivotally supported a platen E adapted for coöperation with a printing cylinder F to be presently described. The carriage is adapted to be moved along the guideway by any suitable means, a knob or finger-piece D being provided on the carriage for this purpose. As shown, the knob is attached to the top of the carriage, and extends upwardly therefrom, so as to be positioned for convenient access by the operator.

Figure 3:
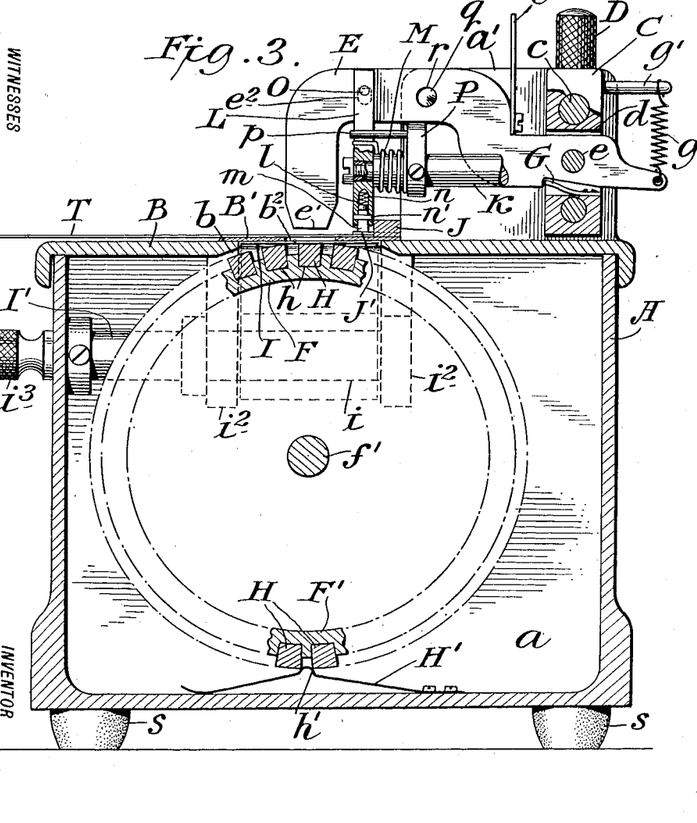

Platen E is shown in the form of a hammer or lever, said hammer or lever being bent to the form shown more particularly in Fig. 3 so as to pass through slot $d$ in the carriage, one arm of the lever being pivotally supported in the carriage on a pin $e$. The operative end $e'$ of the hammer overhangs the slot in top plate B', and normally this hammer is retained in a position free from contact with the slotted plate by a suitable latch mechanism to be presently described. The hammer is actuated forcibly in one direction when released from the latch by a spring $g$, one end of which is connected to the pivoted arm of the hammer, whereas the other end of the spring is anchored on a pin $g'$ extending outwardly from carriage C. If desired, a spring G may be mounted on the carriage so as to act against the hammer in a direction to press it upwardly from the slotted plate B', and thus retain the hammer in a position free from contact with an inked ribbon, but as the hammer is locked in a raised position by the action of the latch, spring G may be omitted. For lifting the hammer, it is preferred to employ a pressure piece $e^2$, the same extending upwardly from the hammer and positioned near to knob D, in order that the operator may grasp said knob D and pressure piece $e^2$ between the fingers of the hand, whereby the hammer may be lifted from contact with an inked ribbon and the carriage moved along the guideway by the operation of one hand.

Figure 2:
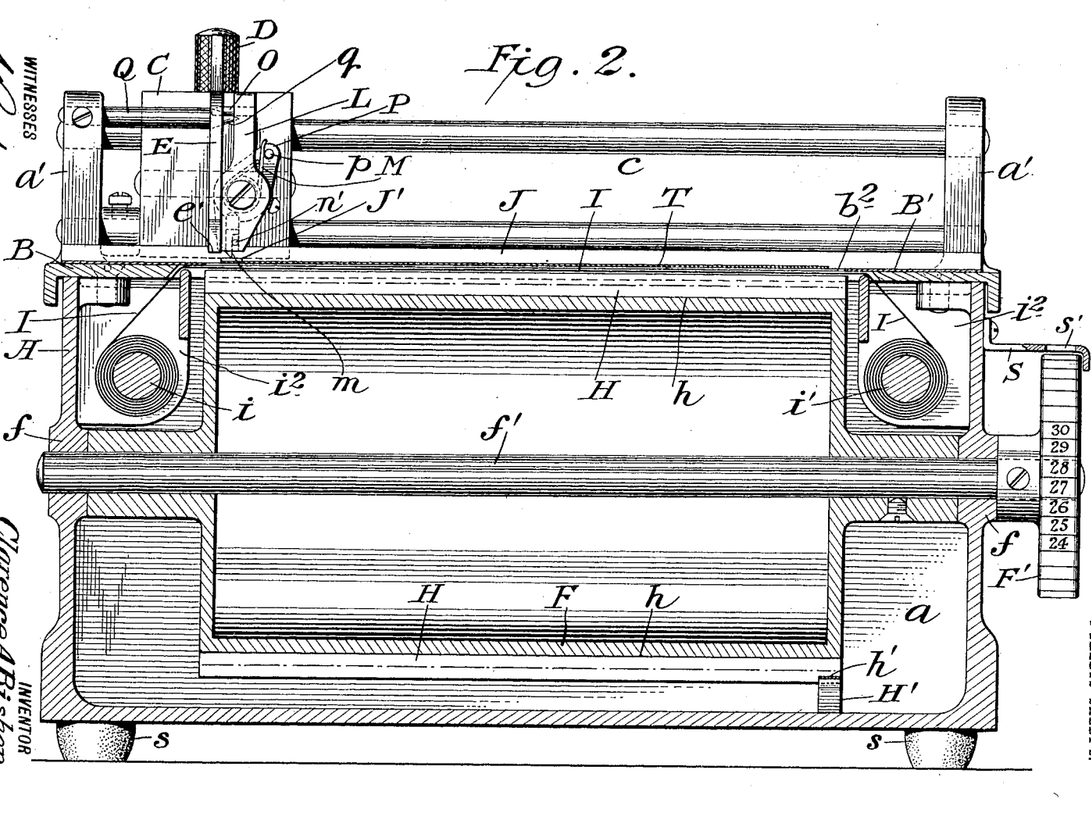
Fig. 2 is a vertical section taken longitudinally through the machine on the line 2—2 of Fig. 1, parts being shown in elevation.

The frame A is shown in Fig. 2 as having its end members provided with bearings $f$ for a horizontal shaft $f'$ which carries the printing cylinder F. Said printing cylinder is positioned within chamber $a$ of the frame and below table B, whereby the printing cylinder is substantially housed or incased within the chambered frame or base of the machine. The shaft $f'$ of the printing cylinder extends at one end beyond the frame, and it is shown as having an operating member F' secured thereto, said operating member being preferably in the form of a hand wheel which is provided with a scale, as shown in Figs. 1 and 2, the numbers on which scale represent the rates of the wage columns, the positions of said numbers corresponding to the wage columns carried by the printing cylinder. The hand wheel is outside of the casing for convenient access by the operator in order that the printing cylinder may be rotated whenever it is desired to bring one of the wage columns into position below the slot $b^2$ in plate B'.

The printing cylinder is constructed to receive a series of type bars, each type bar being provided with printing characters in the form of a column of figures representing the value of the wages for a day's labor, the units of the column of figures being based upon calculations of fractions of an hour multiplied by the wage rate per hour. In the illustrated example of each wage column, it is assumed that ten minutes is the unit of time, and this unit of time is multiplied by the rate per hour. The column of figures of each wage scale increases in value from one end of the column to the other, the highest figure in the column representing a full day's value in wages, and the lowest figure in the column being the value in wages for ten minutes of time. The figures in one wage column are based upon a certain rate per hour, the figures in the next rate column are based upon a different rate per hour, and so on throughout the series of wage columns which are carried on the cylinder F. The wage columns are positioned on the cylinder correspondingly to the numerals on the hand wheel F'; thus the wage column based on a rate of twenty-four cents per hour will be positioned on the cylinder in register or alinement with the numeral 24 on the hand wheel, and so on throughout the series of wage columns and figures on the cylinder and the hand wheel, respectively. As shown, cylinder F is provided with a series of longitudinal channels $h$, and in these channels are positioned type bars H, the latter being retained in fixed positions within the channel by any suitable means (not shown). Obviously, the type bars are provided with numerals representing the figures in the wage scales, and these type characters are cast on the type bars, or produced thereon by the electrotyping process. The type bars run lengthwise of the cylinder, and they are parallel to each other, said type bars being spaced on the cylinder so that the printing characters on one type bar when the cylinder is adjusted to aline or register the type bar with the slot $b^2$ will be exposed through the said slot to access by the operative end $e'$ of hammer E. The cylinder is adapted to be rotated by the manipulation of hand wheel F' for the purpose of bringing either of the series of type bars into register with the slot $b^2$. The cylinder is retained in its adjusted position by any suitable form of detent, as for example, the spring detent H' shown in Fig. 3. Said detent is a spring attached at one end to the bottom of casing A, said spring having an offset $h'$ adapted to enter the space between any two of the type bars H, whereby the offset of the spring engages the type bars with sufficient frictional contact to preclude accidental rotation of cylinder F.

Suitable means are provided for inking the type bars, whereby printed impressions may be obtained upon a time card when hammer E is actuated. In the embodiment of the invention shown in the drawings, the inking mechanism consists of a ribbon I extending below the slotted plate B' and across the column of figures constituting the printing characters on one type bar. The respective end portions of ribbon I are coiled on spools $i$, $i'$ positioned within compartments $i^2$ of casing A, and at the respective ends of cylinder F. Each spool is carried by a shaft I' supported in suitable bearings on frame A or compartment $i^2$, said shaft I' being extended beyond the front of the frame and provided with a knurled knob $i^3$, whereby the spool may be rotated for the purpose of winding the inked ribbon upon one spool and unwinding the ribbon from the other spool. It is evident that any kind of inked ribbon may be used, and that said ribbon may be adjusted from time to time in order to present a freshly inked surface over the printing characters of the wage columns on the type bars. As shown, the inked ribbon is positioned between the type bars of the printing cylinder and the path of travel of the hammer E as it is moved back and forth with carriage C relative to the table B. A time card upon which the imprint is to be made is intended to be placed upon table B and top plate B', said top plate being positioned intermediate the time card and the inked ribbon, thereby preventing the direct contact of the time card with the inked ribbon so that ink from the surface of said ribbon will not be transferred to the time card in the operation of placing said card into position in the machine or removing said card from the machine.

J designates a guide bar for limiting the insertion of the time card when placing the same into the machine preliminary to the operation of printing the wage value upon said card. This guide bar J is attached to table B at one side of the slots $b$ in the table, and $b^2$ in plate B'. The guide bar extends a suitable distance above the table and the plate, and it is adjacent to the slot $b^2$ in said plate B', whereby the time card, when inserted into the machine, will come into contact with the guide bar, and the latter will determine the extent of the edgewise insertion of the card into the machine.

Figure 4:
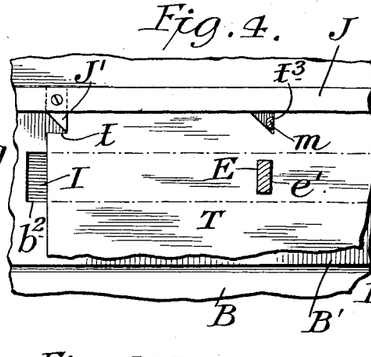
Fig. 4 is a detail view of a part of the machine illustrating the primary guide by which the position of the time card is determined when said card is placed in the machine.
Figure 5:
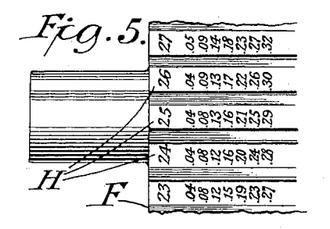
Fig. 5 is a plan view of a part of a rotatable printing cylinder illustrating a plurality of wage scales thereon.

In addition to guide bar J, the machine is provided with a guide J' which extends forwardly from the guide bar and is very close to, or extends part way across, slot $b^2$ in plate B'. This guide J' coöperates with a corner of the time card upon which the imprint is to be made. As shown in Fig. 4, the guide J' is adapted to fit into a notch provided in a corner of the time card. Said guide determines the relation of the card to a wage scale on the type bar of the printing cylinder, whereby a time scale or scales on each time card will be brought into correct relation to the column of figures composing one wage scale of the printing cylinder.

Figure 6:
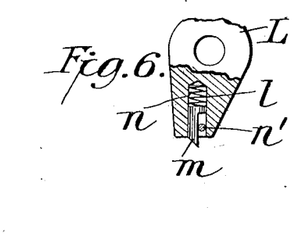
Fig. 6 is a detail view of a trip and a yieldable toe-piece for coöperation with a notch in a time card.

For the purpose of determining the position of the printing platen or hammer relative to the desired number in the column of figures of a particular wage scale upon the movement of carriage C along the guideway and the table, I employ a trip or stop device which is movable with the carriage and is so positioned that it will automatically engage with a predetermined designation which is placed upon the time card by the workman. In the embodiment shown of the trip device, it serves the functions of a latch for retaining the printing hammer in a raised position, as well as for arresting the movement of the carriage and the hammer when the trip device comes into contact with the designation placed upon the time card by the workman prior to the insertion of said time card into the machine. Extending outwardly from carriage C is an arbor or spindle K, the latter being at one side of and parallel to hammer E, whereby the hammer and the spindle are mounted on the carriage for movement therewith. This spindle carries a trip L, the same being shown as a plate or bar mounted loosely upon spindle K for movement freely thereon, whereby the trip is adapted to rock or turn on the spindle. The lower part of the trip is provided with a recess or chamber $l$ in which is slidably fitted a toe-piece $m$, the latter being free to rise and fall within said chamber $l$. The toe-piece is pressed normally in a downward direction by a spring $n$ housed within the chamber $l$, and such downward movement of the toe-piece is limited or arrested by a stop pin $n'$, as shown more particularly in Fig. 6, and in dotted lines in Fig. 2. The toe-piece is provided on one side with a bevel, as shown in Fig. 6, so that it will ride over the permanent guide $J'$ when the carriage and the devices thereon are removed toward the left in Fig. 2. The other side of the toe-piece from the bevel is perpendicular to plate $B'$, and this perpendicular side of the toe-piece is adapted to come into contact with an edge of the recess or perforation which constitutes the permanent designation which is placed upon the time card by the workman. The trip is actuated in one direction by a coiled spring M fitted loosely around spindle K and having two arms, one of which engages with the pivoted trip and the other with a pin $p$ which is secured to member P, the latter being fixed in a suitable way on spindle K. The fixed pin is connected by member P and spindle K with the carriage, and this pin serves as an abutment for one end of spring M. The upper part of trip L carries a latch O, the same being shown in the form of a pin which is attached to the pivoted trip near its upper end, said latch being adapted for engagement with an aperture $e^2$ provided in hammer E. The spring acts on the trip to press the latch pin into engagement with the aperture in the hammer for the purpose of locking said hammer in a raised position, whereby the operative end $e'$ of the hammer is normally in a raised position with reference to the slotted plate $B'$.

After printing the number representing the wage value for a particular time at a specified rate upon the time card, the carriage C, the hammer and the parts coöperating therewith are returned to a normal position over the permanent guide $J'$. When the carriage and hammer are to be shifted lengthwise of the machine, the operator grasps knob D and pressure piece $e^2$ for lifting the hammer and sliding the carriage along the guideway. I may, and preferably do, employ means for automatically lifting and resetting the hammer as the carriage reaches the limit of its movement in the direction toward normal position over the guide $J'$. The resetting device is shown in the form of a stem Q having a beveled conical end $q$ adapted to enter an aperture $r$ which is provided in hammer E. The resetting stem Q is attached rigidly to a post $a'$ at the left of the machine frame by suitable means such as the clamping screw $r'$, said resetting stem occupying a fixed position on the machine frame and in the path of the aperture $r$ in the hammer E. When the carriage, the hammer and the coöperating parts are moved by hand over the permanent guide $J'$, the beveled end $q$ of resetting stem Q enters the aperture $r$, the stem being so related to the hammer that the beveled end of said stem will ride against one edge of the aperture in a manner to lift the hammer against the tension of a spring $g$. When the hammer is lifted sufficiently for the aperture $e^2$ in said hammer to come opposite to the latch pin O, the spring M acts on the trip L to press the latter toward the hammer and thereby move latch pin O into aperture $e^2$, for the purpose of locking the hammer in a raised position. It will be understood that the operation of resetting the hammer and locking it in its raised reset position is performed automatically by stem Q, trip L, and latch O upon the return of the carriage and the hammer to a position over the permanent guide, thus relieving the operator from the labor and attention of manually resetting the hammer to an operative position.

The machine frame is supported on a table by rubber feet $s$ of any suitable construction. To one end portion of the machine frame is secured a plate S, positioned to extend over the numerals on the edge of hand wheel $F'$, said plate S having an observation slot $s'$ through which may be viewed the number on the hand wheel corresponding to the rate of the particular wage column on the type bar which is in register with the slot $b^2$ on plate $B'$.

Various forms of time cards for use by the workmen may be employed, two forms of such cards being shown in Figs. 7 and 8. The card T shown in Fig. 7 is shown as being provided in one of its corners with a permanent index $t$, which is preferably in the form of a notch or recess cut into the corner of the card. In addition to the permanent index, the card T is provided with words or spaces indicating the department number, the operation, the number or name of the workman, and various other data for identifying the particular job of work performed by the workman. In addition to the foregoing, the card is provided with a column $t'$ at the head of which appears the rate of wages paid to the workman per hour, and said ticket is provided, also, with a scale $t^2$ referred to as an elapsed time scale. This scale contains numbers from one to eight or more, inclusive, corresponding to the working hours of the day, and each hour is subdivided into intervals of ten minutes. When a ticket or card, such as T, is given to the workman at the beginning of a day's work, the proper data is filled in the several spaces, the particular workman being given a card, the wage rate of which corresponds to the rate at which the workman is to be paid for his labor. When the job of work is completed, the workman marks the card in a way suitable for use in the calculating machine herein described, such marking of the card producing a particular designation which, upon the proper insertion of the card into the machine, will position the said particular designation in the path of the toe-piece on the pivoted spring-actuated trip L.
As shown, the particular designation is in the form of a notch $t^3$ which is cut into an edge of the card by a suitable punch. This notch is punched by the workman in the card when the job is completed, the notch $t^3$ being punched in the card opposite to the particular subdivision of time noted on the elapsed time scale $t^2$. More properly speaking, the card T of Fig. 7 is a "job ticket," on which the wage value for one piece of work is to be printed. Accordingly, a job ticket is to be given to the workman with each job of work, said ticket is to be punched at the beginning and completion of the work, and is to be turned in to the accounting department upon the completion of the job.

The time card U, shown in Fig. 8 of the drawings is shown as being provided with a permanent index $u$, the column $u'$, and spaces adapted to receive various data, the permanent index $u$ and the rate column $u'$ being similar to the permanent index $t$ and rate column $t'$ of the ticket shown in Fig. 7. Instead of the elapsed time scale $t^2$, the ticket U of Fig. 8 is provided with a time scale $u^2$, indicating in hours and divisions thereof the time of starting and completing the work on a particular job or jobs. Accordingly, the ticket U is adapted to be used for a series of jobs, and said ticket is to be retained by the workman until he completes the day's work, at which time the ticket is to be delivered to the foreman. Obviously, the card T may be provided on one side with an elapsed time scale $t^2$, and on the opposite side with the starting time scale $u^2$, thus combining the desirable features of the time cards T, U, shown in Figs. 7 and 8, respectively.

The operation is as follows:—When a job of work is assigned to a workman, he is at the same time given a time card with a rate printed thereon corresponding to the wages paid to him per hour, said time card being of one form or another, such as shown in Fig. 7 or 8. Assuming that the card is delivered to the workman at the beginning of the day, it is not necessary for said workman to punch the card, for the reason that the permanent index $t$ or $u$ denotes the beginning of the time of work on the job. When the workman completes his task on the job assigned to him, he places the designating character on the card opposite to the division of time on the time scale on the card to denote thereon the time of completing the work. In Figs. 7 and 8, this designating character is a notch $t^3$ punched in the edge of the card, said notch being opposite to the mark in the time scale denoting the time of completing the work.

Should the workman be furnished with a "job ticket" of Fig. 7, it is delivered to the foreman when the job is completed. But, should the workman be supplied with a card having the starting time scale of Fig. 8, then the ticket is punched when the first job is completed, and the workman retains the ticket when he starts the second job. The workman then proceeds with his work on the second job, and when the second job is completed, another designating character, such as the notch $t^4$ is produced in the edge of the card opposite to the mark in the starting time scale denoting the time at which the second job was completed, and these operations are repeated as often as necessary. At the end of a day's labor, or at any other time, the time cards of the workmen are sent to the accounting division of the factory, office, or other business establishment, and these cards are utilized in calculating the wages of the workmen, and in estimating the costs on the particular jobs, the calculating machine of Figs. 1 to 6, inclusive, being employed in connection with the time cards to expeditiously and economically effect the calculations. The accountant assorts the cards according to the rate scales thereon; thus, all cards filled in and punched by the workmen paid at the rate of twenty-four cents per hour are assorted into one pile, the cards representing the other rates of wages paid to the workmen being similarly assorted into piles. With the time cards thus assorted before him, the accountant proceeds to calculate the wages in the following manner:—Assuming that carriage C and hammer E are adjusted to the left of the machine, in the position of Figs. 1 and 2, and with the hammer locked in a raised position over permanent guide J', a time card is selected from a pile, and the cylinder F is turned until the numeral on index wheel F', corresponding to the rate of the selected time card, is below the slot $s'$, at which time the proper type bar containing the appropriate wage scale is brought into position below slot $b^2$ in the top plate of the table. The time card is now inserted edgewise into the machine until the notched edge of said time card comes into contact with guide rail J, the corner of the card, or the permanent index $t$ or $u$ of said card, fitting snugly to permanent guide J', whereby the rail J and permanent guide J' accurately determine the position of the inserted time card with reference to the column of figures on the selected type bar. It is to be observed that the divisions in the time scale on the time card will correspond to the order of the numerals in the column of figures on the particular type bar which lies just below the slot $b^2$. The operator now moves the carriage C by pressing upon finger-piece D so as to advance said carriage and the hammer along slot $b^2$ and the table, the spring-actuated toe-piece m being pressed into frictional contact with the top face of the card.

Assuming that a job ticket T has been inserted into the machine, the movement of the carriage is continued until the toe-piece drops or falls into notch $t^3$ of the time card, whereupon the following operations take place: The continued movement of the carriage is arrested by the perpendicular face of the toe-piece abutting against the edge of the notch or perforation in the card; the toe-piece thus meets resistance and operates to turn trip L on the pivot afforded by spindle K, thus turning the trip against the tension of spring M; the movement of the trip pulls the latch pin O free from engagement with hammer E, thus releasing said hammer, whereupon the spring g becomes effective in imparting a sudden downward impulse or movement to the hammer, whereby the operative end $e'$ of the hammer is forced against the card and against the particular figure in the column of figures constituting the wage scale, thus resulting in an imprint of the figure from the column of the type bar H against the face of the card, the imprint being due to the action of the hammer against the card and said hammer coöperating with the inked ribbon on the type bar.

The position of the carriage and hammer are determined automatically by the toe-piece of the trip engaging with the notch in the time card, and the hammer is brought automatically into operation by the movement of the trip which disengages the latch from the hammer. The position of the hammer relative to the wage scale being determined automatically by the engagement of the trip with the notch of the card, results in the printed impression being placed upon the card at the point opposite to the notch produced in the card by the workman, and thus the value of the wages is computed automatically and mechanically and a record of said wages is made upon the card. After the value of the wages shall have been printed upon the job ticket T, it is removed from the machine, and another ticket inserted in the manner described, whereupon the operations are repeated.

When a time card U is inserted into the machine, its position is determined by guides J and J', and the machine is operated to determine the wage cost on the several jobs represented by the card, as follows:—After the card is first positioned with notch u in operative relation to guide J', the carriage is moved over the card until toe-piece m contacts with an edge of notch $t^3$, whereupon the hammer is released and coöperates with the wage scale on the type bar and with the ribbon to print the wage value for the first job upon the card, after which the carriage is returned to position over the guide J'. The card is now removed from guide J' and shifted lengthwise of rail J so that notch $t^3$ in the card will receive guide J', and then the carriage is again moved along the card until the toe-piece m engages with an edge of notch $t^4$, thereby arresting the carriage and releasing the hammer for the purpose of printing in column $u'$ the wage value for the second job. These operations of printing the wages for the individual jobs are repeated as often as there are notches in the card, and thus the card U has as many calculations printed thereon as there are notches in the edge thereof, the distance between two notches representing the time devoted to each job. The wage values for the work performed by the workman on one or more jobs, as indicated by the notches in the proper card, having been computed, and the desired records obtained, the card is removed from the machine, and another card is placed therein in the manner heretofore described, whereupon the operations of determining the wage values of the workman for the second card are carried out as described. The cards in one pile, representing one rate having been used in the machine to determine the value of the wages to be paid to the different workmen, the operator next proceeds to compute the value of the wages at a different rate as represented by the cards in another pile, preliminary to which the cylinder F is adjusted by manipulating wheel F' until the proper rate number thereon appears below slots $s'$.

It should be remarked that between the operations of computing the wage values of two successive cards, the operator returns carriage C to its normal position, at which time stem O engages with hammer E so as to reset the same for the latch O to again lock the hammer in the raised position, the beveled face of the spring-actuated toe-piece m riding upon guide J' so as to bring said beveled toe-piece into a position to rest upon the guide in the normal position of the hammer.

From the foregoing description it is apparent that the operations of calculating wages at any rate and for any predetermined length of time may be accurately and automatically performed, thus relieving the accountant of the labor of estimating or calculating the wages of the workmen on particular jobs..

The invention in its broad aspect is not strictly confined to the particular machine disclosed, for the reason that various modifications in the mechanism may be resorted to without departing from the spirit of the invention. For example, it is not necessary to automatically operate hammer E for the reason that said hammer may be manually operated by thumb-piece $e^2$ when its position relative to the wage column is determined. Again, the invention involves a method or mode of procedure of obtaining a record of the wage value, said method embodying the steps of punching or otherwise marking the card at the completion of the work on a job by the workman, positioning said card in a certain predetermined relation to a wage scale, the figures in which are based upon calculations of certain intervals of time at a specified rate, shifting one element of a printing mechanism into a relation to the wage scale which is determined by the designating character placed upon the time card by the workman, and operating said printing mechanism to secure the desired calculation upon one surface of the card.

Having thus fully described the invention, what I claim as new, and desire to secure by Letters Patent is:—

1. In a calculating machine, the combination of a suitable printing surface adapted to print various predetermined values, a platen coöperating therewith, means for effecting movement of the platen to different operative positions with respect to the various parts of said printing surface, and means whereby the printing position of said platen is determined by a suitable predetermined designation on a card upon which the printing is to be effected.

2. In a calculating machine, the combination of a suitable printing surface adapted to print predetermined amounts, a platen coöperating therewith, said printing surface and the platen being each movable relative to the other so as to assume different printing positions, and means whereby the said printing positions are determined by a predetermined designation on the element on which the imprint is to be made.

3. In a calculating machine, the combination of a suitable printing surface provided with a plurality of series of printing characters representing wage scales, a platen coöperating therewith, means for positioning the printing surface with reference to the platen whereby any of the said characters may be printed, means for effecting movement of the platen to different operative positions with respect to the printing surface, and means whereby the position of the platen is determined by a designation on an element on which the imprint is to be made.

4. In a calculating machine, the combination of a printing cylinder containing wage scales, means for adjusting said cylinder whereby any of said scales may be printed, a platen coöperating with said printing cylinder, a carriage on which the platen is mounted, and a member on said carriage adapted to coöperate with a predetermined designation on a time card on which the wage value is to be printed, whereby the position of said platen is determined for effecting the desired printing operation.

5. In a calculating machine, the combination of a printing surface, a platen movable to various operative positions relative to said printing surface, and means coöperating with the platen and a predetermined designation on a card on which the printing is to be effected, whereby the particular printing position of said platen is determined.

6. In a calculating machine, the combination of a printing surface, a platen movable to various operative positions relative to said printing surface, and means coöperating with the platen and a predetermined designation on a time card on which the printing is to be effected, whereby the particular printing position of said platen is determined and the printing operation automatically performed.

7. In a calculating machine, a printing surface adapted to print wage values, a card guide for determining the relation of a time scale on a time card to said printing surface, a platen movable to different positions relative to the time scale of the card and to the printing surface, and means positioned for coöperation with a designating character on the time card for determining the relation of the platen to said time scale and the printing surface.

8. In a calculating machine, a printing surface the printing characters of which form a wage scale, a guide in coöperative relation to said wage scale for determining the position of a time card, provided with a time scale, relative to the wage scale, a printing element coöperating with said printing surface, said printing element and the printing surface being each capable of relative movement to the other in order to position the printing element opposite to any unit of the wage scale, and means coöperating with a designating character on the time card for determining the extent of relative movement between the printing surface and the printing element.

9. In a calculating machine, printing mechanism embodying a printing element and a printing surface each movable relative to the other to different printing positions, the characters of said printing surface forming a wage scale, a card guide occupying a coöperative relation to said wage scale for determining the relation of a time scale on a time card to said wage scale, and means coöperating with a designating character on the time card for determining the relative positions of the printing element and the wage scale.

10. In a calculating machine, a printing surface the characters of which form a wage scale for printing wage values, a printing element movable to different operative positions relative to the wage scale, a card guide for accurately positioning a time scale on a time card in register with the wage scale, and means coöperating with a designating character placed on the time card by a workman for determining the relation of the printing element to the time scale and the wage scale.

11. In a calculating machine, a printing surface the characters of which form a wage scale for printing wage values, a platen movable to different operative positions relative to the wage scale, a card guide positioned for engagement with a designating character on a time card which is provided with a time scale, whereby the time scale of said card is brought into register with the numbers of the wage scale, and means for limiting the movement of the platen relative to the time card, said means coöperating with a designating character placed upon the time card by a workman at the completion of a particular piece of work.

12. In a calculating machine, a printing cylinder provided with a series of type bars the printing characters of which are in the form of numerals forming wage scales, a platen movable to different operative positions relative to said wage scales, means for adjusting the cylinder to present either of the type bars in position for coöperation with the platen, a card guide for determining the relation of a time scale on a time card to one of said wage scales, and means coöperating with a designating character on the time card for limiting the movement of the platen relative to the time scale on said card.

13. In a calculating machine, a printing surface the characters of which are in the form of a wage scale, a carriage, a platen supported by the carriage for movement to different operative positions relative to the wage scale, a card guide for determining the relation of a time card to said wage scale, and means coöperating with a designating character on the time card for determining the position of said platen relative to a particular unit of the wage scale.

14. In a calculating machine, a printing surface the characters of which are in the form of a wage scale, a carriage, a platen supported by the carriage for movement to different operative positions relative to the wage scale, a card guide for determining the relation of a time card to said wage scale, means coöperating with a designating character on the time card for determining the position of said platen relative to a particular unit of the wage scale, and means for operating said platen when it reaches said operative relation to the wage scale.

15. In a calculating machine, a printing surface the characters of which are in the form of a wage scale, a carriage, a platen supported by the carriage for movement to different operative positions relative to the wage scale, means for locking the platen in a position free from contact with a time card, a card guide for determining the relation of a time card to said wage scale, means coöperating with a designating character on the time card for determining the position of said platen relative to a particular unit of the wage scale, and means for automatically operating said platen when it reaches said operative relation to the wage scale.

16. In a calculating machine, a printing surface the characters of which represent a wage scale for printing wage values, a platen coöperating with said wage scale, a carriage in which the platen is supported, means for retaining the platen in a position free from contact with the wage scale, a card guide for positioning a time card in operative relation to the wage scale, means on the carriage for coöperation with a designating character on the time card for determining the position of the platen relative to the wage scale, and means for automatically operating said platen when it reaches said predetermined position.

17. In a calculating machine, a printing surface the characters of which represent a wage scale for printing wage values, means for inking the printing characters of said wage scale, a platen coöperating with said wage scale, a carriage in which the platen is supported, means for retaining the platen in a position free from contact with the wage scale, a card guide for positioning a time card in operative relation to the wage scale, means on the carriage for coöperation with a designating character on the time card for determining the position of the platen relative to the wage scale, and means for automatically operating said platen when it reaches said predetermined position.

18. In a calculating machine, a printing surface the characters of which represent a wage scale for printing wage values, a platen coöperating with said wage scale, a carriage in which the platen is supported, means for retaining the platen in position free from contact with the wage scale, a card guide for positioning a time card in operative relation to the wage scale, means on the carriage for coöperation with a designating character on the time card for determining the position of the platen relative to the wage scale, means for releasing the platen from said retaining means when it reaches the said predetermined position, and means for resetting the platen upon return to position over the card guide.

19. In a calculating machine, a printing surface the characters of which represent a wage scale for printing wage values, a carriage, a platen supported on the carriage, means for locking the platen in an inoperative position, means for retaining a time card in position relative to the wage scale, and a trip for releasing the platen, said trip being positioned for contact with a designating character on the time card.

20. In a calculating machine, a printing surface the characters of which represent a wage scale for printing wage values, a carriage, a platen supported on the carriage, means for determining the position of a time card relative to the wage scale, and a trip movable with the carriage and operating to retain the platen in a position free from contact with the time card, said trip coöperating with a designating character on the time card for determining the position of the platen relative to the wage scale, whereby the platen is automatically released when it reaches said predetermined position.

In testimony whereof I have signed this specification in the presence of two subscribing witnesses.

CLARENCE A. BISHOP.

Witnesses:
H. T. BERNHORD,
J. F. MOTHERSHEAD.

Copies of this patent may be obtained for five cents each, by addressing the "Commissioner of Patents, Washington, D. C."